United States Patent [19]

Stella et al.

[11] 4,203,655
[45] May 20, 1980

[54] TAPERED PRESSURE PAD TO PREVENT FILM SCRATCHING

[75] Inventors: Joseph A. Stella, Peabody; Paul B. Mason, Magnolia, both of Mass.

[73] Assignee: Polaroid Corporation, Cambridge, Mass.

[21] Appl. No.: 248

[22] Filed: Jan. 2, 1979

[51] Int. Cl.² .............................................. G03B 23/02
[52] U.S. Cl. .................................. 352/78 R; 352/130
[58] Field of Search ...................... 352/130, 78 R, 72; 15/100

[56] References Cited

U.S. PATENT DOCUMENTS

| | | | |
|---|---|---|---|
| 1,401,013 | 12/1921 | Teitel | 15/100 |
| 1,928,235 | 9/1933 | Taylor | |
| 2,341,460 | 2/1944 | Martin | |
| 2,351,371 | 6/1944 | Smith | 352/130 |
| 2,981,170 | 4/1961 | Brault | |
| 3,122,781 | 3/1964 | Mutter | |
| 3,470,576 | 10/1969 | Troia | 15/100 |
| 3,551,201 | 12/1970 | Marchese et al. | |
| 3,641,905 | 2/1972 | Adams | |
| 3,643,579 | 2/1972 | Downey et al. | 352/78 R |
| 3,665,890 | 5/1972 | Mishler | 118/412 |
| 3,748,994 | 7/1973 | Stella | 352/130 |
| 3,785,725 | 1/1974 | Batter et al. | 352/78 R |
| 3,806,245 | 4/1974 | Land et al. | 352/130 |
| 3,812,515 | 5/1974 | Cook | 352/130 |
| 3,832,048 | 8/1974 | Batter et al. | 352/130 |
| 3,903,541 | 9/1975 | Von Meister et al. | 354/317 |

*Primary Examiner*—Monroe H. Hayes
*Attorney, Agent, or Firm*—Leslie J. Payne

[57] ABSTRACT

Method and fluid applicator apparatus usable in a photographic film cassette and including a pressure pad having a film engaging surface for slidably supporting successive incremental portions of a strip of photographic film in a given plane as the film strip progressively advances in a given direction across a nozzle opening through which processing fluid is deposited on the film's emulsion surface having a particle engaging surface depending from the film engaging surface and facing in a direction opposite to the direction to divert particles impinging thereagainst in a manner and direction so that they are prevented from being caught by the particle engaging surface of the pressure pad.

6 Claims, 5 Drawing Figures

TAPERED PRESSURE PAD TO PREVENT FILM SCRATCHING

BACKGROUND OF THE INVENTION

The invention relates generally to photographic film cassettes and, more particularly, to a processing method and a fluid applicator including a pressure pad for use in slidably supporting incremental portions of a photographic film strip advancing in the film cassette, while avoiding particles carried by the film strip from becoming accumulated or trapped by and between the film strip and the pressure pad.

Multipurpose film cassettes have been developed for use in exposing, processing and projecting a strip of photographic film which is operated at all times in the cassette. Film cassettes of this type are disclosed in several U.S. patents assigned in common with the present invention.

In film cassettes of this category, a supply of light sensitive photographic film can be selectively exposed in a camera particularly adapted to receive and operate the cassette. To process or develop the exposed film, the cassette is removed from the camera and placed in a player or processing and viewing apparatus capable of activating a cassette contained processor for depositing a uniform layer of processing fluid on the film's exposed emulsion surface. During such processing a conventional series of successive, positive transparent images on the exposed film is developed. Following processing in the manner indicated, the player apparatus is operated as a projector. During projection, the film is incrementally advanced, frame-by-frame, past a light source. Accordingly, the series of positive transparent images of the scenes to which the film were exposed are capable of being successively viewed while projected onto a screen.

These cassettes have proven to be highly successful in operation. For successful operation, however, it is extremely critical that a uniform and extremely thin thickness of processing fluid be maintained over at least the exposed emulsion portion during film processing. Also, for successful operation, it is important to prevent the film's processed images from being adversely affected by objectionable processing fluid streaks or scratching. Towards the end of achieving the desirable thickness and eliminating undesirable fluid streaks, the cassette contains a spring biased pressure pad. The pressure pad supports the film strip in slidable engagement with a nozzle structure of the processor so that the film is in a predetermined spaced relationship to a doctoring surface of the nozzle, thereby facilitating formation of the desired thickness. In this regard, the film travels beneath the doctoring surface so that the latter forms the uniform processing fluid thickness; which fluid was earlier deposited onto the film strip through a nozzle opening positioned upstream of the doctoring surface in the context of film strip advancement during processing. To prevent film carried foreign particles from becoming trapped by the doctoring surface and thereby causing the objectionable streaks, the pressure pad has a leaf spring to provide a net balance of forces upon the film strip. In this manner, any foreign particles carried by the film's emulsion surface and trapped by the doctoring surface will cause a temporary increase in the spacing between the film and doctoring surface. Accordingly, particles which otherwise would be trapped can continue to be carried past the doctoring surface without causing the objectionable wakes or streaks.

The spring biased pressure pad is successful in avoiding having film carried particles trapped by the doctoring surface. A potential exists, however, for the wedging or trapping of foreign particles by the leading edges of the pad, which edges face in a direction opposite film strip advancement, and the film's nonemulsion surface during such advancement. This is because of the fact that not only are foreign particles carried by the film's nonemulsion surface, but also because the typical pressure pad is fabricated from metal and has the edges of the film engaging surface with curved corners which extend transversely across the film strip width. It will be appreciated that stamping of metal prevents formation of a film engaging surface having sharply defined or perpendicular corners relative to the remainder of the pressure pad. Rather, stamping causes formation of curved corners. Curved corners, or lack of perpendicularity of the film engaging surface corners, enables the film carried particles to become trapped by and between the leading edge corner of the film engaging surface, in the context of film strip advancement, and the film's non-emulsion surface. By reason of such trapping, there is the likelihood that such particles will scratch the non-emulsion surface.

Prior attempts to solve this scratching problem have suggested the use of a plastic pressure pad having film engaging surfaces with sharply defined corners to reduce the likelihood of film carried particles becoming trapped by and between the film and the pressure pad. Further, such film engaging surfaces have a width less than that of the film. This further reduces the likelihood of trapping. Despite such reduction, a potential for difficulties still arises by virtue of the fact that the leading edges of the film engaging surfaces create the potential for a certain amount of particle accumulation. Due to this trapping potential, there is a likelihood that the non-emulsion surface will be continuously scratched; thereby adversely affecting viewing of the processed film images.

Moreover, the problems of avoiding scratching of the non-emulsion surface are further compounded by the requirement that each cassette carry its own pressure pad and that the cassette and its components including the pressure pad must be capable of mass production manufacturing techniques and be within tolerance levels incident to such techniques for the system to be acceptable in a competitive commercial market. Accordingly, the structural organization of the means by which the film strip is supported in predetermined relationship to a cassette contained processor so as to avoid continuous scratching of the film's non-emulsion surface caused by trapped particles is critical to the overall system in which the cassette is used.

SUMMARY OF THE INVENTION

In accordance with the present invention, the potential for problems associated with scratching the non-emulsion surface of photographic film strip caused by dust or other foreign particles becoming lodged or accumulated by and between such surface and a film cassette contained pressure pad is substantially eliminated. Elimination is achieved by the provision of an improved pressure pad which prevents such accumulation.

As in prior pressure pads of the type usable in photographic film cassettes, a film engaging surface directly contacts and supports incremental portions of the film strip in a predetermined plane relative to a cassette contained processor nozzle structure which has a nozzle opening through which processing fluid is deposited onto the film's emulsion surface during advancement of the film in a given direction of film advancement. In an illustrated embodiment, at least one particle engaging surface depends from the film engaging surface and faces in a direction at least opposite to the given direction and is constructed so as to divert film carried foreign particles impinging thereagainst in a manner and direction such that the particles are prevented from being retained by the pressure pad. In this manner, the potential for continuously scratching the non-emulsion surface by such particles is substantially eliminated.

In another embodiment of this invention, the pressure pad has another particle engaging surface facing in a direction opposite to the other of the two directions of film travel. This surface also diverts particles impinging thereagainst in a manner and direction so that they are not trapped by the pressure pad, thereby avoiding film scratching.

Among the objects of the invention are, therefore, the provision of an improved pressure pad assembly in a multipurpose film cassette for supporting incremental portions of the film strip of a photographic film during processing so that foreign particles carried by the non-emulsion surface portion of the film strip do not become engaged by and between the pressure pad and non-emulsion surface; and the provision of an improved method of substantially eliminating the adverse effects of scratching on the film's non-emulsion surface by foreign particles being engaged by and between the pressure pad and the non-emulsion surface.

Other objects and further scope of applicability of the present invention will become apparent from the detailed description to follow in conjunction with the accompanying drawings wherein like parts are designated by like reference numerals.

DETAILED DESCRIPTION OF A PREFERRED EMBODIMENT

Figure 1:
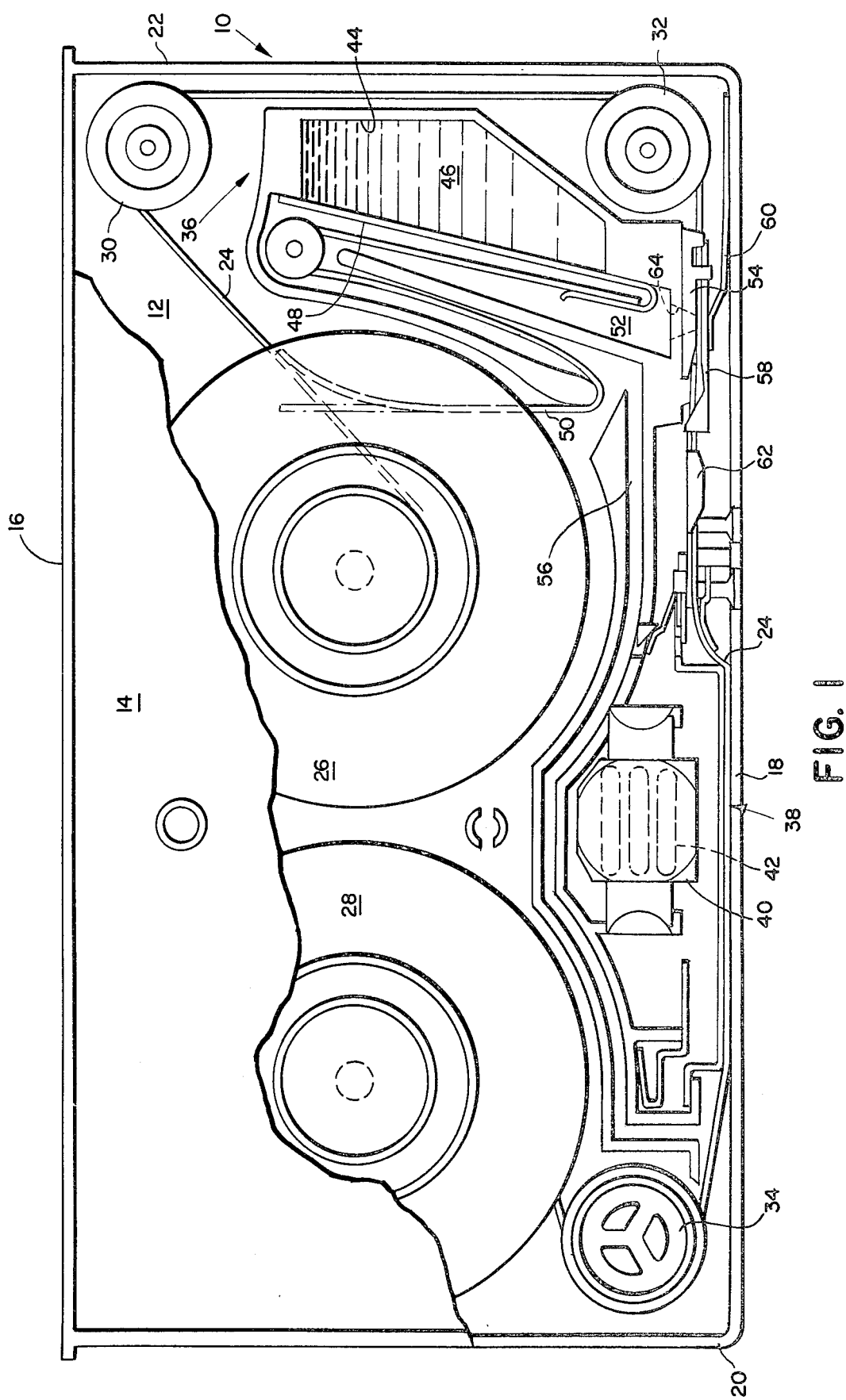
FIG. 1 is a side elevational view, partially broken away and partially in cross section, illustrating the interior arrangement of a photographic film cassette incorporating the improved pressure pad of the present invention.

In FIG. 1 of the drawings, a multipurpose film cassette incorporating the principles of the present invention is shown to include a housing 10 which takes the form of a rectangular parallelepiped having a pair of exterior side walls 12 and 14 connected together by top, bottom and end walls 16, 18, 20 and 22, respectively.

Within the housing 10, a film strip 24 is connected at opposite ends to supply and take-up spools 26 and 28, respectively, for movement through a series of linear flights or runs defined by a bobulator roller 30, an idler or guide roller 32 and a snubber roller 34. When the film strip 24 runs between the guide roller 32 and snubber roller 34, in passing from the supply spool 26 to the take-up spool 28, it traverses a processor or fluid applicator 36 and an exposure/projection aperture 38 formed in the bottom housing wall 18 under a reflecting prism 40 located adjacent ventillating openings 42 in the side wall 12.

Included in the applicator 36 is a reservoir or pod 44 containing processing fluid 46 initially sealed by a tear strip 48 which is connected to a film strip engaging pull strip 50. It is pointed out that the construction and operation of the pull strip 50 is adequately disclosed in U.S. Pat. No. 3,895,862 issued July 22, 1975 to Joseph A. Stella et al. Therefore, the pull strip 50 need not be further described here except to note that upon initiation of a processing cycle, it becomes engaged by an aperture (not shown) in the end portion of the film strip 24 to pull the tear strip 48 away from the pod or reservoir 44. As a result, the processing fluid 46 is allowed to flow into a chamber 52 formed at its bottom by an applicator nozzle structure 54. At the completion of the tear strip removal operation, the pull strip 50 becomes wound between the convolutions of the film strip 24 on the supply spool 26, whereas the tear strip 48 becomes separated and remains in the storage chamber 56.

Also, in accordance with the disclosures of prior patents, including the one mentioned above, as the film strip 24 runs between the rollers 32 and 34, it passes between the bottom of the nozzle 54 and a pressure pad 58 biased upwardly by a spring 60 supported in the bottom wall 18 of the housing 10. Positioned upstream of the nozzle 54 (in the context of film strip travel during rewinding or processing as indicated in FIG. 2 by arrow 61) is a valve member 62, which is engageable by a necked-down portion, not shown, in the leading end portion of the film strip 24 so as to be advanced from the position shown to a position, not shown, underlying the nozzle 54 at the end of the processing cycle.

Figure 2:
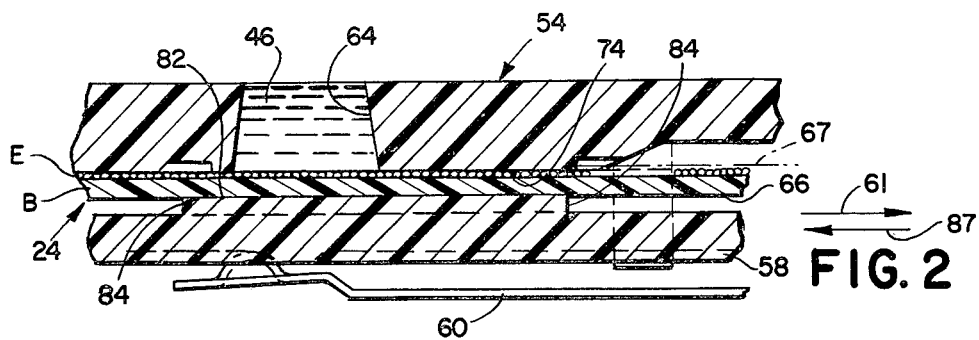
FIG. 2 is an enlarged diagrammatic view illustrating the cooperation between the improved pressure pad of this invention with the film strip and nozzle structure during film processing.
Figure 4:
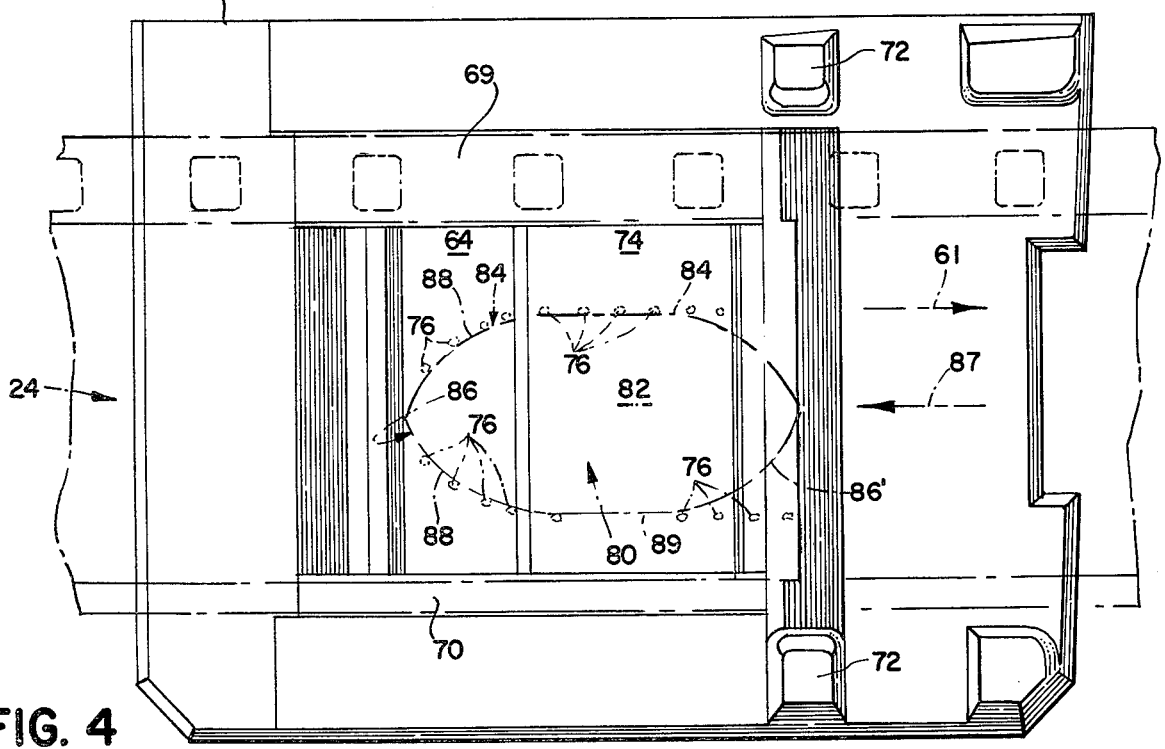
FIG. 4 is an enlarged bottom plan view of the processor nozzle structure illustrating in phantom lines the film strip, the positioning of the film supporting member of the pressure pad and the film carried particles.

An understanding of the nozzle 54 and its use in operation may be gained by continued reference to the drawings and, in particular, FIGS. 1, 2, and 4. In this embodiment, the nozzle 54 is an integral molding of suitable synthetic resinous material. Extending from top to bottom is a generally rectangular shaped nozzle opening 64 through which the processing fluid 46 is released onto the upper surface of an emulsion layer E carried by and extending across the width of a carrier base B having a dry, non-emulsion, back surface 66.

Figure 3:
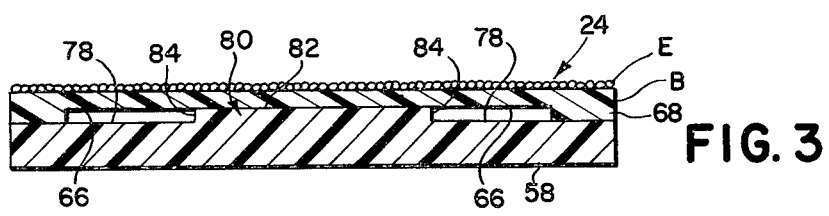
FIG. 3 is an enlarged cross section view illustrating the cooperation between the film strip and pressure pad.

Prior to completing the description of the nozzle 54, it is important to note that the deposited layer 67 (FIG. 2) of the processing fluid 46 be protected from disturbance until it has dried completely. Such protection is accomplished by having the film strip 24 provided with a pair of edge rails 68 which function to space adjoining convolutions of the film strip when the latter is wound in its wetted condition onto the supply spool 26. A film strip having such a configuration is described and claimed in U.S. Pat. No. 3,782,263 entitled "Photographic System Employing Film Margin Rails" of E. H. Land et al. and assigned to the assignee of the present application. The film's edge rails 68 are best shown in FIG. 3.

Returning to a description of the nozzle 54, FIG. 4 illustrates the underside surface configuration of the nozzle 54, which faces the film strip 24, and is shown to include elongated planar guide tracks 69 and 70 located on the opposite sides or lateral edges of the nozzle opening 64 so as to be oriented in overlying relation to and in sliding contact with the longitudinal margins of the emulsion layer E. As a result, the film strip 24 can be maintained in a preselected planar arrangement relative to the nozzle opening 64. Also, since one longitudinal margin of the film strip 24 is larger than the other for accommodating the film's feed apertures, the guide track 69 is wider than the guide track 70. Depending from the underside of the nozzle 54 is a pair of post-like abutments 72 which laterally guide the film strip 24 past the nozzle 54 and also act as stops for the valve member 62.

With continued reference to FIGS. 2 and 4, a doctoring surface 74 is shown to be located downstream of the nozzle opening 64; as viewed in the context of film strip advancement in the processing or rewind direction 61. The doctoring surface 74 is formed by a generally planar, inclined surface extending transversely between the guide tracks 69 and 70. Also, the doctoring surface 74 extends from a leading edge, adjacent the downstream edge of the nozzle opening 64, to a trailing edge terminating above the upper surface of the emulsion layer E by a preselected distance. As a result, the doctoring surface 74 has a preselected spaced relation to the film strip 24, whereby deposition of the uniform processing fluid layer 67 on the emulsion surface E is facilitated as the film strip 24 moves across the nozzle 54.

Also in conventional fashion, the doctoring surface 74 produces a desired positive hydrodynamic pressure gradient in the processing fluid 46 passing therepast (which pressure increases in the rewind direction 61), thereby enhancing deposition of the uniform processing fluid coating 67 on the film strip 24. It will be appreciated that the hydrodynamic forces developed by the doctoring surface 74 will be a function of the latter's length and inclination, as well as the viscosity of the processing fluid 46, velocity of film strip travel relative to the doctoring surface 74 and the distance the trailing edge is above the emulsion layer E.

While the housing 10 constitutes an essentially lighttight enclosure for the film strip 24, openings such as the ventilation openings 42 and the exposure/projection aperture 38, which are important to overall system operation, prevent complete exclusion of the film carried foreign particles 76, such as dust, to the housing interior.

Although the effect of such foreign particles on the film strip 24, or otherwise within the cassette interior, during use of the cassette is not significantly different than it is for conventional exposure or projection of motion picture film strips, it is important, as noted, for completely satisfactory operation of the cassette that such foreign particles not damage the surfaces of the film strip 24. One of the detrimental effects of the presence of the foreign particles 76 within the housing 10 is the possibility of the backside or non-emulsion surface 66 becoming scratched by such particles becoming engaged by and between the non-emulsion surface and the pressure pad 58.

In accordance with the invention the pressure pad 58 of the illustrated embodiment is configured to avoid such scratching. Prior to describing the improved configuration of the pad 58, the overall function of the pad will be reviewed with reference to FIGS. 2–5. Essentially, the pressure pad 58 serves to continuously maintain progressive incremental portions of the film strip 24 in engaging relation with the guide tracks 69, 70 just below the nozzle opening 64 and doctoring surface 74 so that the film strip 24 assumes the desired spaced distance and planar relationship to such nozzle opening and doctoring surface as the film strip travels in the processing direction 61. Additionally, the pressure pad's support of the progressive incremental portions of the film strip 24, beneath the nozzle 54 which develops a positive hydrodynamic force in the processing fluid 46, minimizes distortion of the film strip.

Figure 5:
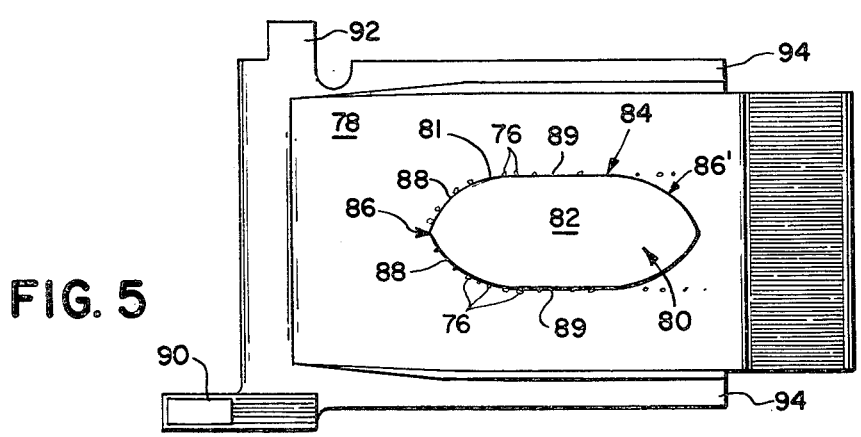
FIG. 5 is an enlarged plan view showing in greater clarity the improved pressure pad of this invention and in phantom lines film carried foreign particles cooperating with the pad.

The pressure pad 58 is an integral molding of a suitable synthetic resinous material and, as shown in FIGS. 2, 3 and 5, is seen to comprise a substantially planar surface 78. Extending vertically from the planar surface 78 is an integrally connected film supporting member 80 having a film engaging surface 82 for slidably supporting successive incremental portions of the film strip 24 during progressive advancement of the film strip in either direction of the latter's movement in the housing 10 during exposure, processing or projection.

In this embodiment, the film supporting member 80 has a width less than the full width of the film strip 24. Consequently, there is less likelihood of the foreign film carried particles 76 becoming trapped by the film supporting member 80. Whatever width dimensions are selected for the film supporting member 80, they should be sufficient to perform the vital function of supporting the film strip 24 so that the longitudinal margins thereof contact the guides 69, 70 as the film strip passes beneath the nozzle opening 64 and doctoring surface 74. In this manner then, the noted planar relationship is maintained and the uniform and controlled deposition of the processing fluid 46 is achievable.

With continued reference to FIGS. 4 and 5, it will be seen that the particle engaging surface 84 at one of its longitudinal ends has a leading edge portion 86 positioned to face in a direction opposite the rewind direction 61. In this embodiment, the leading edge portion 86 has the shape similar to a ship's prow. Accordingly, there are two diverging surface portions 88, each of which diverges toward a longitudinal margin of the film strip 24, as best indicated in FIG. 4. Hence, each surface portion 88 is oblique to the longitudinal axis of the film or, that is, the direction of film travel.

Owing to the foregoing construction, it will be appreciated that when the leading edge portion 86 of the particle engaging surface 84 has the film carried particles 76 (FIG. 4) impinging thereagainst during film strip advancement in the rewind direction 61, such edge portion will, as a result of its configuration, create a sideways reaction force component, in response to the impact force of the particles 76. Accordingly, the engaging particles 76 are diverted laterally in a direction and manner until the particles slide along parallel side portions 89. Continued movement of the film strip 24 frees the particles 76 from engagement with the particle engaging surface 84 so that they resume unobstructed movement with the film strip 24. Accordingly, the foreign film carried particles 76 will not become lodged by and between the non-emulsion surface 66 and the leading edge portion 86. Consequently, the non-emulsion surface 66 will not be continuously scratched by the foreign film carried particles 76.

In this particular embodiment, the end of the film supporting member 80 opposite the leading edge portion 86 may also have an edge portion 86' with a prow-like shape to divert the foreign film carried particles 76 therealong in the manner of the leading edge portion 86. Accordingly, such a construction would prohibit any foreign film carried particles from becoming wedged or lodged by and between the non-emulsion surface 66 and the particle engaging surface 84, as the film strip 24 travels in the exposure direction (to the left as viewed in FIGS. 2 and 4 indicated by arrow 87) which is opposite the rewind direction 61.

It is contemplated by this invention that the film supporting member 80 and the particle engaging surface 84 may assume other configurations, so long as the film strip 24 is supported in the noted spaced relationship relative to the nozzle 54, and film carried particles 76 are diverted by the particle engaging surface, in a manner and direction, so that the possibility of such particles becoming caught by and between the non-emulsion surface 66 and the particle engaging surface 84 is eliminated.

Turning again to the general description of the pad assembly and referring to FIG. 4, the arrangement of the elongated film engaging surface 82 with respect to the nozzle opening 64 and the doctoring surface 74 is best seen. Such arrangement will successively support the entire length of the incremental portions of the film strip 24 which pass the nozzle opening 66 and the doctoring surface 74.

As noted, whatever width dimension is selected for the film engaging surface 82, it should be adequate in terms of supporting the film strip 24 consistent with the requirement of maintaining the incremental film portions under the nozzle opening 64 and the doctoring surface 74 in the desired spaced and planar relationships. In this regard, the width of the film engaging surface 82 is dependent, among other things, upon the magnitude of the hydrodynamic force developed in the fluid passing under the doctoring surface 74 and also upon what may be referred to as the "beam strength" of the film strip 24. Stated otherwise, it is a function of the ability of the unsupported portions of the incremental sections of the film strip 24 passing the processor 36, as measured between the respective points of support, to resist deflection under the applied hydrodynamic force of the fluid.

A continuous particle engaging surface conformation 84 is formed on the film supporting member 80 and in this preferred embodiment extends away at right angles (FIGS. 2 and 3) from both the non-emulsion surface 66 and the film engaging surface 82. This orthogonol relationship of the particle engaging surface 84 is achievable because of the fact that the plastic pressure pad 58 is molded. As noted earlier, if the film supporting member 80 were stamped from metal, there could not be formed a particle engaging surface at right angles to a film engaging surface. This is because stamping would cause metal to bend with a radius (not shown) at the intersection of two surfaces otherwise at right angles. Formation of such a radius would enable the film carried particles to be trapped by and between the non-emulsion surface 66 and the pressure pad 58.

The pressure pad 58 is further provided with an upwardly extending guide arm 90 adapted to overlie a portion of the slide valve 62 to assure proper engagement of the slide valve with the pressure pad when the slide valve is moved into position between the pressure pad and the nozzle assembly following termination of the processing operation. Another outwardly directed projection 92 provided on the pressure pad 58 is adapted to be received by a suitable positioning notch (not shown) in the cassette which, together with a pair of shoulders 94 provided at the other end of the pad, engage suitable upstanding posts 72 (see FIG. 4) to restrict the degree of lateral motion of the pressure pad with respect to the nozzle 54.

To provide a more complete understanding of the operation of the applicator 36 and its pressure pad 58, the overall operation of the system will now be briefly explained. In operation of the cassette, the film strip 24, as supplied in its unexposed condition, will be essentially entirely contained on the supply spool 26 with a leader extending about the rollers 30, 32 and 34 to the take-up spool 28. The cassette is constructed to be placed within a camera (not shown) adapted to receive and operate the same. Operation of the camera will result in the film strip 24 being selectively exposed as it is incrementally advanced past the exposure/projection aperture 38 to the take-up spool 28 in the forward or exposure direction 87. After the film strip 24 has been completely exposed, the cassette housing 10 is removed from the camera and inserted in a specially constructed player apparatus (not shown) which is operable in either a processing mode or projecting mode. As earlier noted, this player apparatus is equipped with means cooperable with the various operating components of the cassette to operate the latter in such mode.

Assuming the exposed film strip 24 has not been processed, the player operates to initially rewind the film so that the pull strip 50 becomes engaged by an aperture (not shown) in the trailing end portion of the film strip 24 to pull the tear strip 48 away from the pod or reservoir 44. As a result, the processing fluid 46 flows through the chamber 52 and the nozzle opening 64 so as to be deposited on the emulsion layer E.

Referring in particular to FIG. 4, it will be understood that during the application of the processing fluid 46, the film carried particles 76 carried by the non-emulsion surface 66 (not shown) travel in the rewind direction 61 and impinge the particle engaging surface 84. Owing to the combination of the generally oblique positioning of the leading edge portion 86 of the particle engaging surface 84 and its generally orthogonal relationship to the film engaging surface 82, as well as the impact force of the particles 76, the particles will be forced and guided along such leading edge portion towards the film margin. Thereafter, the diverted particles 76 continue to travel along the parallel side portions 89 of the particle engaging surface 84 until no longer in contact therewith. Consequently, the possibility of the foreign film carried particles 76 becoming trapped is eliminated. Accordingly, the foreign film carried particles 76 cannot adversely affect the non-emulsion surface 66 by scratching the latter so as to detrimentally affect viewing of the processed, recorded images.

Thus, it will be appreciated that as a result of this invention an improved pressure pad structure is provided for photographic film strip processors by which the abovementioned objectives are completely fulfilled. Also, it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by reference to the appended claims.

What is claimed is:

1. In a film cassette having a processing fluid applicator and a pressure pad assembly, said assembly having a resiliently biased pressure pad with a film engaging surface constructed to slidably, supportingly engage successive incremental portions of a non-emulsion surface of a strip of photographic film in a predetermined plane as the film is advanced in one of two opposite directions of film travel across a nozzle opening of the processing fluid applicator while the processing fluid is deposited through the nozzle opening onto the film's emulsion surface, the improvement comprising:

said pressure pad having at least one particle engaging surface depending from said film engaging surface and facing in a direction at least opposite to said one direction, said particle engaging surface being constructed to divert film carried particles impinging thereagainst in a manner and direction such that the particles are prevented from being retained by said pressure pad so as to substantially eliminate the possibility of the non-emulsion surface being scratched by such particles during film advancement in said one direction.

2. The apparatus of claim 1 wherein said one particle engaging surface includes at least a portion thereof mounted at an oblique angle to said one direction of film travel so as to thereby divert said film carried particles around said pad.

3. The apparatus of claim 1 wherein said pressure pad includes another particle engaging surface facing in the other of said two directions to thereby prevent retention of such particles by said pressure pad during film advancement in said other direction so as to substantially eliminate the possibility of the non-emulsion surface being scratched by such particles during film advancement in either direction.

4. The apparatus of claim 3 wherein said another particle engaging surface includes at least a portion thereof at an oblique angle to said other direction of film travel so as to thereby divert said film carried particles around said pad.

5. The apparatus of claim 1 wherein said one particle engaging surface has at least two generally diverging portions connected to opposite sides of a central apex portion, and each one of said two diverging portions extends generally towards opposite longitudinal margins of the film.

6. The apparatus of claim 1 wherein said supporting means includes a film engaging surface constructed to supportingly engage less than the full width of such incremental film portions as the film is advanced in said given directions.

* * * * *